Patented May 28, 1935

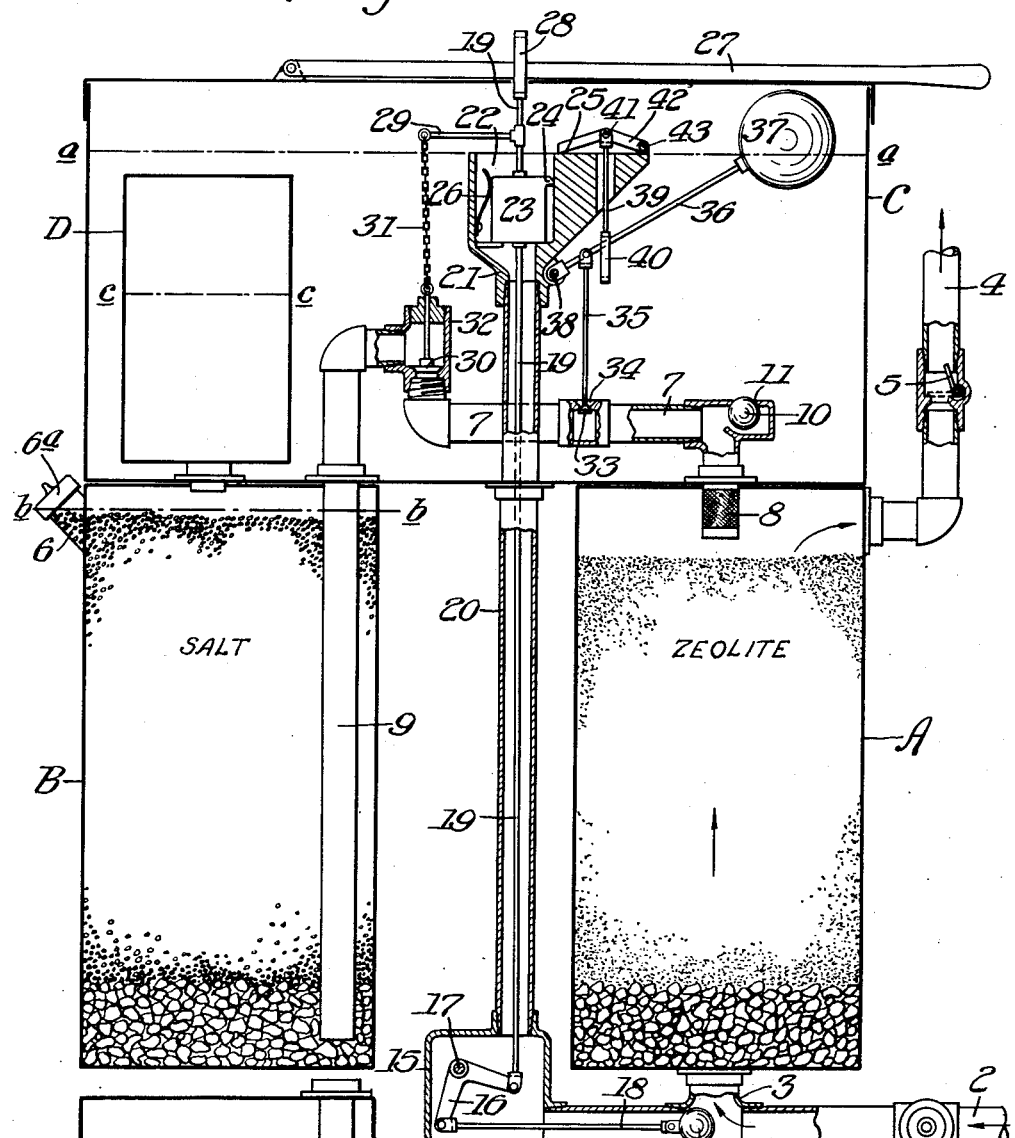

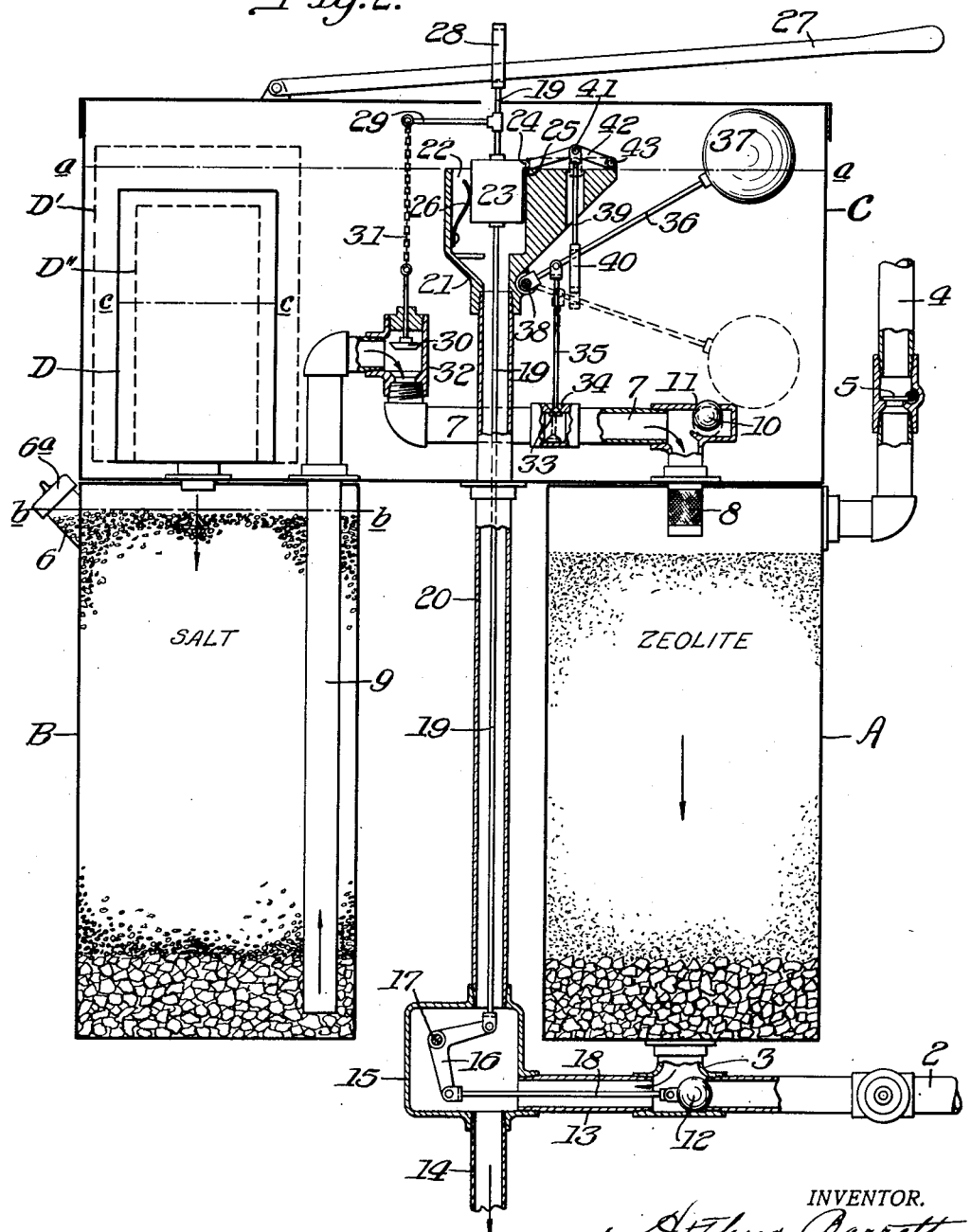

2,003,230

UNITED STATES PATENT OFFICE 2,003,230

APPARATUS FOR SOFTENING WATER

Arthur Barrett, Bellevue, Pa.

Application December 4, 1931, Serial No. 578,931

12 Claims. (Cl. 210—24)

This invention relates to improvements in the art of water softening, and more particularly to a method and apparatus therefor utilizing a chemical softening agent capable of being regenerated or reconditioned after use.

It is common practice to use zeolite for softening water, the sodium in the zeolite replacing the calcium and magnesium in the raw water. When the zeolite becomes ineffective it is regenerated by passing salt water or brine therethrough to replace the used sodium.

Various methods and means have been employed heretofore for controlling the circulation of water and brine with respect to the zeolite comprising complicated valve mechanisms manually or electrically actuated, necessitating considerable attention during operation.

Also, the regeneration process generally consists of a reverse flow of brine and a flushing of water through the zeolite without an acurate determination of the quantity of brine or water used, resulting in waste, loss of time, and inefficient operation.

There is a fixed relation between the amount of zeolite and the necessary amount of brine to effect complete regeneration without waste, the proportions of zeolite and brine being readily ascertainable by those skilled in the art; and also, the volume of water necessary for flushing may be determined and utilized without unnecessary waste.

My invention contemplates in a water softening system, a new and improved apparatus for controlling the circulation of water and brine operable for the most part by the flow of the water in the system.

A further aim is to provide in such an apparatus, means for controlling the regenerating circulation requiring but a single manual operation for starting, and employing a back pressure chamber whereby a constant volume of brine is passed through the zeolite at each regeneration period. In addition, the apparatus is of such a construction that the same will be automatically returned to position for softening immediately upon the completion of the regenerating circulation.

My invention further contemplates providing a method of regeneration in connection with such a system, whereby a predetermined volume of brine is initially displaced and held in equilibrium during the normal softening operation, and is then passed through the zeolite upon the release of the water pressure in the system.

A still further object is to flush the zeolite with a predetermined volume of water under low static pressure immediately after the brine circulation has been completed, said volume of water being automatically released to flow through said zeolite when the pressure of the brine falls below said static pressure.

Additional objects and advantages will become apparent from the following description taken in connection with the accompanying drawings, wherein:

Fig. 1 is a vertical sectional view of the apparatus showing the parts thereof in position for softening;

Fig. 2 is a similar view showing the parts in position for regenerating the zeolite; and Fig. 3 is a fragmentary view of the brine chamber showing a modified construction.

Referring to the drawings, A designates a softening chamber or tank containing a chemical agent as for example, zeolite, capable of removing the hardening elements from water, said chamber being connected at its lower end with the city line or other supply of raw water 2 by means of a T coupling member 3. The service line 4 for the soft water opens out of the upper end of the chamber A and is provided with a check-valve 5 to prevent a back flow of water into said chamber.

A salt or brine chamber B is provided beside the chamber A, having a suitable supply opening 6 at its upper end portion for the introduction of salt thereto, said opening being provided with a cap or other closure means 6a.

Above chambers A and B, I provide a water chamber or reservoir C of suitable dimensions. A back-pressure chamber D is also provided in open communication with the upper end of the brine chamber B. For compactness, the chamber D is shown positioned within the reservoir C, but is not in communication therewith. The function and operation of the back-pressure chamber D will be hereinafter more fully described.

A controlling mechanism is provided for the circulation of water and brine in the system and includes a conduit 7 extending between the chambers or tanks A and B, connecting the upper end of the former by means of a strainer 8, and the latter by means of a conduit 9 opening into the bottom of said brine chamber. A check-valve 10 is positioned in the conduit 7 above or in close proximity to the chamber A for controlling an opening 11 in said conduit in communication with the reservoir C.

A ball-valve 12 is designed to reciprocate in the T member 3 to alternately admit raw water from the line 2 to the chamber A, and to release waste water from said chamber through a conduit 13 to a drain 14, said conduit and drain being in open communication with a hollow casing 15. The casing 15 mounts a bell crank 16 on a cross shaft 17, pivotally connecting the valve 12 by a rod 18, and having pivotal connection with an operating rod or member 19 disposed in a vertical pipe or conduit 20, said conduit opening at its lower end into the hollow casing 15.

Conduit 20 is provided at its upper end with a hollow head member 21 secured thereto and positioned in the reservoir C, said member 21 having an enlarged cavity or opening 22 therein in communication with the conduit 20 and the reservoir. Motivating means, as for example a weight 23, is secured to the upper portion of the rod 19 and is provided with an extending abutment or latch 24 at one side thereof for engagement with the upper shouldered corner of surface 25 of member 21. The opposite side of said weight is contacted by a spring 26 for assisting and insuring the engagement of the latch, as in Fig. 2.

Rod 19 or an equivalent extension thereof extends upwardly beyond the reservoir C for engagement by an operating lever 27, and is provided with a vertically slotted member or yoke 28 secured to the end of rod 19 for receiving said lever.

A laterally extending member or bracket arm 29 is secured to the upper portion of rod 19 between the yoke 28 and weight 23, and is connected with a check-valve 30 in the conduit 7 by means of a flexible element as chain 31. Said valve is movable vertically in a suitable casing 32 positioned in the conduit 7, for regulating the flow of water and brine therethrough.

The conduit 7 is also provided with a valve 33 for controlling an opening 34 therein in communication with the reservoir C for the purpose of filling said reservoir. If desired, said reservoir may be filled from a separate source of supply and the valve 33 arranged in a separate inlet conduit for this purpose, as will be readily understood.

Said valve has a stem 35 pivotally connected to an arm 36 of a float 37, said arm being pivotally mounted on the member 21 at 38 for movement in a vertical arc by the action of the water in reservoir C on the float 37.

Vertically movable with relation to the member 21, I provide a trip rod 39 having a slotted yoke connection 40 with the arm 36 of the float 37, and pivotally connecting at 41 with a trip, generally designated 42. Said trip is shown in the form of a toggle connected at its center hinge with the rod 39 as at 41, and having one end thereof hinged to the member 21 at 43. The other end of the toggle is freely slidable on the surface 25 of the member 21 in the plane of the latch 24 for co-operation therewith in the manner hereinafter described.

A predetermined amount of zeolite is charged into the softening chamber A, and the chamber B is charged with the required amount of salt through the opening 6, the relative proportions of zeolite and salt being readily determined.

The system is then filled with water, the weight 23 and rod 19 being in the lowered position of Fig. 1 whereby the ball-valve 12 closes the outlet connection of conduit 13 and permits the raw water to flow upwardly through the chamber A and its contained zeolite, under the pressure of the supply line 2.

Due to the fact that there is no water in the reservoir C initially, above the valve seat 11, the float 37 will occupy the dotted line position of Fig. 2, thus opening the valve 33, permitting the rising water from conduit 2 to enter said reservoir and fill the same to the level a—a, at which time the float closes the valve 33 as in Fig. 1. The opening 22 in the member 21, together with the conduit 20, acts as an overflow to carry excess water to the drain 14, thus insuring against flooding the reservoir C.

The upward movement of said float and its arm 36 operates to lift the yoke 40 by engagement with the upper end thereof, thereby erecting the trip 42 by means of the trip rod 39.

The initial flow of water in the conduit 7 also closes the valve 10, and is conveyed to the brine chamber B by conduits 7 and 9, the check-valve 30 being raised from its seat by the upward flow of water through its casing 32.

The water from conduit 9 rises in chamber B through the salt contained therein until the level b—b is reached, said level being determined by the opening 6, the cap or closure member 6a having been removed to open said chamber to the atmosphere, permitting the rising water to overflow through said opening.

Upon sealing said opening 6 by means of its cap 6a, the water or brine will continue to rise in the chamber B and into the chamber D until some level c—c is reached, when the back pressure of the air confined in said chamber D becomes equal to the pressure of the water in the system, as determined by the pressure at the supply line 2, and the system is then in a state of equilibrium.

Fresh soft water may then be drawn off through the service line 4 by means of the usual faucets or taps, not shown, until such time as it becomes necessary to regenerate or recondition the zeolite. The check-valve 30 remains closed during the softening period, preventing any back flow of brine to the chamber A.

A single operation only is required to start the regenerating process. The lever 27 is raised to engage the upper end of the yoke 28 and raise the weight 23 and rod 19 until the latch 24 engages the surface 25 of member 21 as in Fig. 2, the spring 26 urging said latch into engagement. The upward movement of the rod 19 rotates bell crank 16 and reciprocates the ball-valve 12 to close off the supply line 2 and open the conduit 13. Valve 30 is also positively unseated by means of the bracket 29 and the chain 31.

The release of pressure in the chamber A causes a reverse or downward gravity flow of the water therein to the drain 14 as indicated in Figure 2, carrying some of the collected foreign material out of said chamber.

Also, upon the release of the said pressure on the system, the back pressure in the chamber D forces brine from the chamber B through the conduits 9 and 7, and downwardly through the zeolite in chamber A for regeneration in the manner stated.

It is to be noted that the amount of brine delivered to the chamber A by my process and apparatus is equal to the volume contained between the levels b—b and c—c in chambers B and D, and after delivering this definite volume, the brine again assumes the level b—b in the chamber B under atmospheric pressure.

In other words, it is possible at all times to pass the required definite amount of brine through the zeolite for regeneration, by adjusting the volume of the chamber D in relation to the pressure at the supply line, and thus prevent wasting said brine.

Back-pressure chambers may be provided of various volumes as indicated at D' and D" for installation under different water pressure conditions, whereby a corresponding definite volume of brine will be delivered to the zeolite for regeneration.

Upon the delivery of the brine to chamber A in the manner just described, the pressure in the system will drop below the static head of the water in the reservoir C, and the valve 10 will fall, as indicated in dotted lines in Fig. 2, permitting the water in said reservoir to flow through the opening 11 in the conduit 7 downwardly through the chamber A, for flushing the zeolite and removing the brine and foreign material to the drain 14.

The volume of water thus employed for flushing is fixed by the size of the reservoir C and measured by the float 37 which actuates the valve 33 to maintain the water level a—a, said volume being just sufficient to completely remove the brine from the zeolite. The said water, having initially passed upwardly through the zeolite upon filling the system, has been softened, and hence, by restricting the volume thereof to the required amount only, the capacity of the zeolite is not wasted.

The downward gravity flow of said flushing water takes place at low pressure and velocity in comparison with the pressure flow utilized heretofore, thereby preventing any tendency to wash out and carry away zeolite. In addition, the gradual flushing forces or impels the brine through the zeolite slowly to effect a thorough regeneration, and insures a more efficient removal of the brine from the zeolite.

The falling level of the water in reservoir C causes the float 37 to lower to the dotted line position of Fig. 2, whereby its arm 36 co-acts with the yoke 40 of the trip rod 39 to lower said rod, actuating the trip 42 to disengage the latch 24, thus releasing the motivating means or weight 23 which gravitates into the position of Fig. 1, closing the valve 30 and moving the valve 12 to close the conduit 13 and open the supply line 2.

The apparatus will then again be in position for inflow and softening of the raw water by means of the reconditioned or regenerated zeolite in the manner hereinbefore described.

The chambers B and D may be combined into the single chamber B' of Fig. 3 if desired, and suitable pet-cocks or control valves 44 provided at different levels b'—b' and b"—b" for adjusting the volume of the single chamber to various values of the line pressure, in order to deliver the required volume of brine to the chamber A.

It is to be noted that the process and operation of the apparatus requires but a single external manual operation for starting the regeneration, and that otherwise the control is automatically effected by the flow of the liquid therethrough.

Since the regeneration is only necessary at infrequent intervals, the apparatus requires very little attention for continued operation.

While I have shown my process and apparatus in connection with water softening, it is understood that the same may be applied to other analogous processes involving the treatment of liquids without departing from the spirit and scope of the invention.

Various modifications and alterations are contemplated within the scope of the following claims.

What I claim is:

1. In a water softening system employing a water softening material and brine, the herein described means consisting of a softener container, a brine container having an air confining chamber at its top for exerting an opposing balancing air pressure against a predetermined volume of brine under pressure of incoming raw water, means including a superimposed reservoir having an overflow sewer connection and a liquid circulating connection between the containers and water supply and exhaust connections to and from the softener container and from the latter to the sewer connection, for separating and maintaining a measured volume of water under a low static pressure and for passing the brine through the softening material on release of raw water pressure, and for flushing the softening material.

2. In an apparatus of the character described having a softening chamber and a brine chamber, means providing for a circulation of water and brine with respect to said chambers including pneumatic back-pressure means associated with said brine chamber.

3. In an apparatus of the character described having a softening chamber and a brine chamber a water reservoir above and in communication with the softening chamber, a raw water inlet for the softening chamber, a conduit connecting said chambers, a pneumatic back-pressure chamber communicating with the brine chamber and extending into the water reservoir, and means for controlling the circulation of water in said chambers.

4. In an apparatus of the character described having a softening chamber and a brine chamber, a pneumatic back-pressure chamber communicating with the brine chamber, circulation controlling means for the water and brine including a raw water inlet for the softening chamber, a valve for said inlet, a service outlet for conveying soft water from the softening chamber, a conduit connecting said chambers provided with a check valve, means for actuating the inlet valve to open and close the inlet, and means for actuating the check valve connected with the inlet valve actuating means.

5. In an apparatus of the character described having a softening chamber and a brine chamber, a pneumatic back-pressure chamber communicating with the brine chamber, circulation controlling means for the water and brine including a raw water inlet for the softening chamber, a drain connection, a common valve for said inlet and drain connection, a service outlet for conveying soft water from the softening chamber, a conduit connecting said chambers, and manually operable means for actuating said valve to close the inlet provided with gravity actuated means for opening said inlet and closing the drain connection.

6. In an apparatus of the character described having a softening chamber and a brine chamber, circulation controlling means for the water and brine including a raw water inlet for the softening chamber, a drain therefor, a valve for said inlet and drain, a conduit connecting said chambers, a water reservoir communicating with the softening chamber, manually operable means for actuating said valve to close the inlet, and automatic means for actuating said valve to open the inlet including a weight, means connecting said valve and weight, and trip means for the weight operable by the water in the reservoir.

7. In an apparatus of the character described having a softening chamber and a brine chamber, a conduit connecting said chambers, a water reservoir disposed above and in communication with the softening chamber, a check-valve between said reservoir and chamber, means for maintaining a constant level of water in the reservoir including a valve between the conduit and reservoir and a float operatively connected with said valve, a raw water inlet for the softening chamber, a valve for said inlet, and manually operable means for actuating said valve to close the inlet provided with gravity actuated means for opening said inlet.

8. In an apparatus of the character described having a softening chamber and a brine chamber, a conduit connecting said chambers, a water reservoir disposed above and in communication with the softening chamber, a check-valve between said reservoir and chamber, means for maintaining a constant level of water in the reservoir including a valve and a float operatively connected with said valve, a raw water inlet for the softening chamber, a valve for said inlet, means for actuating said valve to close the inlet, means for actuating said valve to open said inlet, and a trip for the said last means operable by the float in said reservoir.

9. In an apparatus of the character described having a softening chamber and a brine chamber, a conduit connecting said chambers, a water reservoir above and in communication with the softening chamber, a valve for said reservoir, a float for said valve operable by the level of water in the reservoir, a check-valve between said reservoir and softening chamber, a check-valve in the conduit, a raw water inlet for the softening chamber, a valve for said inlet, means for actuating said valve to close the inlet including a lever, a linkage connecting said lever and valve, a latch for retaining said valve in closed position, a trip operatively connected with and actuated by the float in the reservoir for releasing the latch, and means on said linkage for moving the same to open the inlet valve upon the release of the latch by said trip.

10. In an apparatus of the character described having a softening chamber and a brine chamber, a conduit connecting said chambers, a back-pressure chamber in communication with the brine chamber, a water reservoir above and in communication with the softening chamber, a valve for said reservoir, a float for said valve operable by the level of water in the reservoir, a check-valve between said reservoir and softening chamber, a check-valve in the conduit, a raw water inlet for the softening chamber, a valve for said inlet, means for actuating said valve to close the inlet including a lever, a linkage connecting said lever and valve, a latch for retaining said valve in closed position, a trip operatively connected with and actuated by the float in the reservoir for releasing the latch, and means on said linkage for moving the same to open the inlet valve upon the release of the latch by said trip.

11. In water softening apparatus as described, the combination of a softening chamber and a brine chamber in side by side relationship, a superimposed water reservoir, a conduit in the reservoir connecting the softening chamber with the brine chamber provided with a check valve, means for maintaining a constant level of water in the reservoir including a valve and a controlling float therefor, a raw water inlet for the softening chamber having a controlling valve, means for opening and closing said valve operatively connected with the check valve, and means communicating with the brine chamber providing for excess supply of water thereto against an opposing pressure.

12. In water softening apparatus as described, the combination of a softening chamber and a brine chamber in side by side relationship, a superimposed water reservoir, a conduit in the reservoir connecting the softening chamber with the brine chamber provided with a check valve, means for maintaining a constant level of water in the reservoir including a valve and a controlling float therefor, a raw water inlet for the softening chamber having a controlling valve, means for opening and closing said valve operatively connected with the check valve, and an air confining extension of the brine chamber providing for excess supply of water thereto against opposing compressed air pressure.

ARTHUR BARRETT.